US012629975B1

(12) United States Patent
Allen et al.

(10) Patent No.: US 12,629,975 B1
(45) Date of Patent: May 19, 2026

(54) ELECTRIC BEAM AXLE WITH ANTI-WINDUP BAR

(71) Applicant: Ford Global Technologies, LLC, Dearborn, MI (US)

(72) Inventors: Steve Scott Allen, Ann Abor, MI (US); Shane Edward Foley, Milford, MI (US); Nicholas Clayton Mangus, Royal Oak, MI (US); Paul Robert Longworth, Ann Arbor, MI (US); Marc Peerbolte, Canton, MI (US); Andrew Moore Willemsen, Dearborn, MI (US); YuChing Hou, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 19/170,533

(22) Filed: Apr. 4, 2025

(51) Int. Cl.
B60G 9/00 (2006.01)
B60G 11/04 (2006.01)

(52) U.S. Cl.
CPC ............... B60G 9/00 (2013.01); B60G 11/04 (2013.01); *B60G 2200/314* (2013.01); *B60G 2200/422* (2013.01); *B60G 2202/112* (2013.01); *B60G 2300/50* (2013.01)

(58) Field of Classification Search
CPC .... B60G 9/00; B60G 11/04; B60G 2200/314; B60G 2200/422; B60G 2202/112; B60G 2300/50
See application file for complete search history.

(56) References Cited

U.S. PATENT DOCUMENTS

| | | | | |
|---|---|---|---|---|
| 5,209,518 A | * | 5/1993 | Heckenliable | ......... B60G 5/047 |
| | | | | 280/124.17 |
| 6,206,407 B1 | * | 3/2001 | Fuchs | .................... B60G 11/42 |
| | | | | 280/686 |
| 7,520,515 B2 | | 4/2009 | Richardson | |
| 7,581,741 B2 | | 9/2009 | Reineck | |
| 8,882,120 B2 | * | 11/2014 | Juriga | ............... B60G 17/0272 |
| | | | | 267/260 |
| 9,327,571 B2 | * | 5/2016 | Pierce | ................... B60B 35/007 |
| 9,969,229 B2 | | 5/2018 | Soles | |
| 10,807,428 B1 | * | 10/2020 | Klein | ...................... B60G 5/047 |
| 11,220,150 B2 | * | 1/2022 | Laforce | ................. B60G 9/027 |
| 11,597,246 B1 | * | 3/2023 | Klein | ................... B60G 11/465 |

(Continued)

*Primary Examiner* — Toan C To

(74) *Attorney, Agent, or Firm* — Burr & Forman; Lorne Forsythe

(57) ABSTRACT

A suspension system of a vehicle may include an electric beam axle operably coupled to a frame of the vehicle, an electric motor operably coupled to the electric beam axle to propel the vehicle, a wheel assembly including a wheel operably coupled to the electric beam axle, a leaf spring assembly and an anti-windup bar. The leaf spring assembly may be operably coupled to a first portion of the frame at a first end of the leaf spring assembly, operably coupled to a second portion of the frame at a second end of the leaf spring assembly, and operably coupled to the electric beam axle between the first and second ends of the leaf spring assembly. The anti-windup bar may be operably coupled to the first portion of the frame at a first end of the anti-windup bar, and operably coupled to the electric beam axle at a second end of the anti-windup bar.

17 Claims, 10 Drawing Sheets

(56)     References Cited

U.S. PATENT DOCUMENTS

| 2007/0145656 A1* | 6/2007 | Svendsen | F16F 1/18 |
| | | | 267/260 |
| 2011/0001300 A1* | 1/2011 | Juriga | B60G 11/113 |
| | | | 280/124.116 |
| 2012/0200057 A1 | 8/2012 | Juriga et al. | |
| 2013/0001914 A1* | 1/2013 | Batdorff | B60G 11/27 |
| | | | 280/124.162 |
| 2013/0062855 A1* | 3/2013 | Juriga | B60G 11/36 |
| | | | 280/124.174 |
| 2018/0297469 A1* | 10/2018 | Liu | F16H 61/0204 |
| 2018/0354331 A1* | 12/2018 | Chen | B60G 11/04 |
| 2019/0061455 A1 | 2/2019 | Buchwitz et al. | |
| 2020/0346506 A1* | 11/2020 | Laforce | B60G 9/027 |
| 2023/0322037 A1* | 10/2023 | Foley | B60G 7/001 |
| 2025/0084907 A1* | 3/2025 | Kibler | F16F 1/20 |

* cited by examiner

ELECTRIC BEAM AXLE WITH ANTI-WINDUP BAR

TECHNICAL FIELD

Example embodiments generally relate to suspension assembly components for electric vehicles having an e-axle and, more particularly, relate to such a suspension assembly with an anti-windup bar.

BACKGROUND

Electric motors that are integrated into an axle of an electric vehicle are referred to as electric beam axles (e.g., e Beam axles), which can also be referred to as "e-axles". These solid axles, which integrate the e-motor, inverter, transmission and axle structure together add a large amount of weight to an axle of the vehicle, especially compared to a typical vehicle with an internal combustion engine (ICE).

Non-smooth road conditions may cause oscillations of the axle, which may in turn cause a modal response. Torque is typically one of the forces that is accounted for in designing suspension systems for ICE vehicles. However, for an electric beam axle, the increased weight of the axle means that after a bump is encountered, inertia can play a significant role in influencing suspension response along with torque. Furthermore, in an e-axle there is no driveshaft to provide any fore-aft control of the system or damping, leaving the suspension to compensate. Accordingly, it may be desirable to design a suspension system that can limit the modal response on an electric beam axle due to inertia in order to increase operator comfort.

BRIEF SUMMARY OF SOME EXAMPLES

In accordance with an example embodiment, a suspension system of a vehicle may be provided. The suspension system may include an electric beam axle operably coupled to a frame of the vehicle, an electric motor operably coupled to the electric beam axle to propel the vehicle, a wheel assembly including a wheel operably coupled to the electric beam axle, a leaf spring assembly and an anti-windup bar. The leaf spring assembly may be operably coupled to a first portion of the frame at a first end of the leaf spring assembly, operably coupled to a second portion of the frame at a second end of the leaf spring assembly, and operably coupled to the electric beam axle between the first and second ends of the leaf spring assembly. The anti-windup bar may be operably coupled to the first portion of the frame at a first end of the anti-windup bar, and operably coupled to the electric beam axle at a second end of the anti-windup bar.

In another example embodiment, a suspension system of a vehicle may be provided. The suspension system may include an electric beam axle operably coupled to a frame of the vehicle, an electric motor operably coupled to the electric beam axle to propel the vehicle, a wheel assembly including a wheel operably coupled to the electric beam axle, a leaf spring assembly operably coupling the frame and the electric beam axle, where the leaf spring assembly includes a primary leaf spring and an auxiliary leaf spring, and an anti-windup bar operably coupled to frame and the electric beam axle.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Figure 1:
FIG. 1 depicts a block diagram of a suspension assembly for a vehicle in accordance with an example embodiment.
Figure 1:
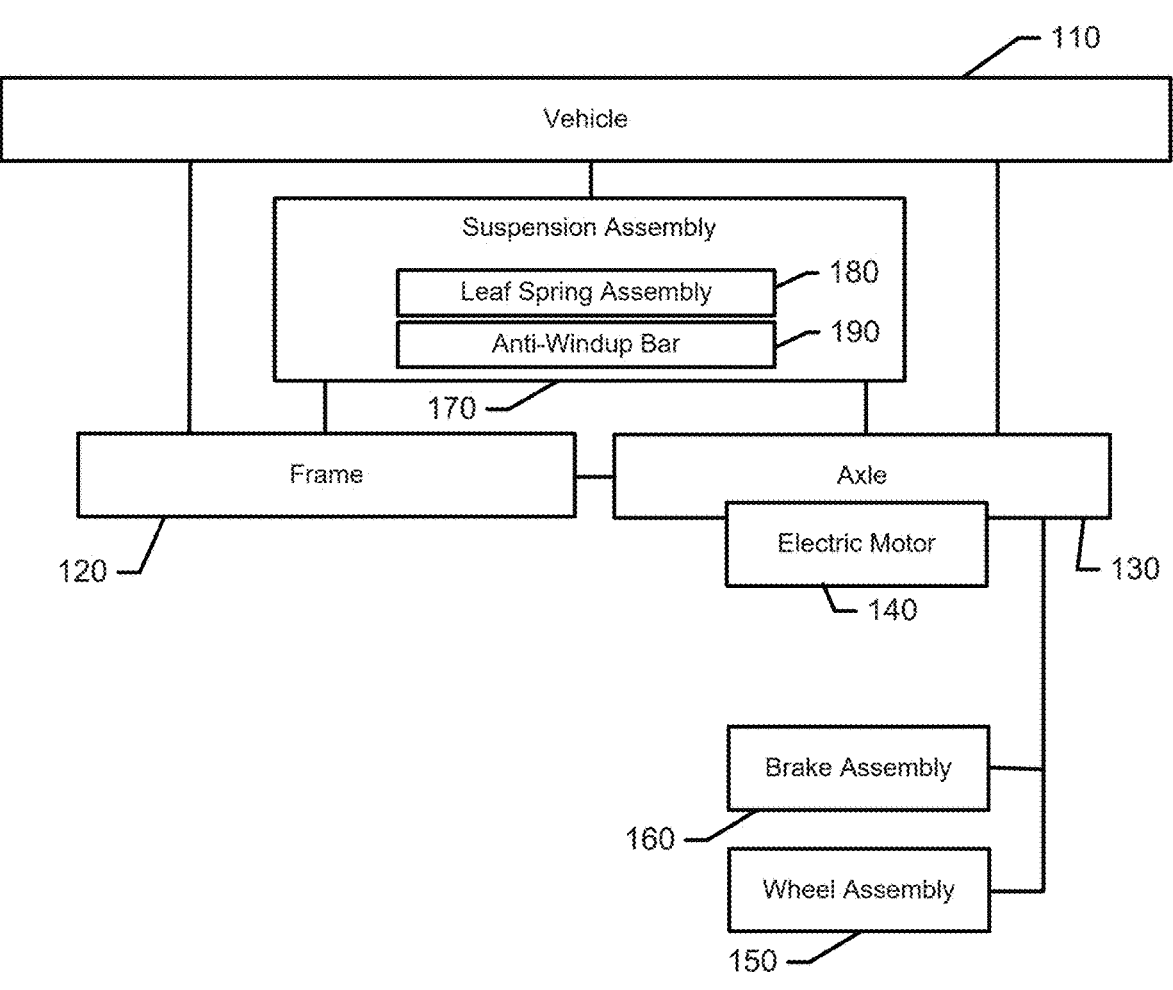

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Additionally, as used herein, terminology such as "about," "approximately" and "substantially," when used to refer to variability of parameters, should be understood to be definite approximations that account for variations in measurements that cannot be, or as one of skill in the art would appreciate, normally are not, measured precisely. Thus, for example, a parameter that is "about," "approximately" or "substantially" a given value or a given characteristic should be understood to be sufficiently close to the given value or given characteristic such that performance of the object or product to which the parameter applies, from the perspective of one with ordinary skill in the art, is the same as though the object or product had precisely the given value or characteristic.

Some example embodiments described herein may address the issues described above. In this regard, for example, some embodiments may provide an anti-windup bar to decrease a modal response and oscillations within a vehicle that would otherwise result from encountering road discontinuities (e.g., bumps) due to the increased inertia of electric beam axles. As a result, the addition of the anti-windup bar may increase operator comfort. Notably, whereas anti-windup bars prior usage has been primarily to address torque response, example embodiments employ an anti-windup bar in an entirely different context, i.e., weight and inertia management and response. Doing so can increase comfort, as noted above, but may also be effective when designed appropriately to manage the unique forces involved in connection with e-axle implementations.

FIG. 1 illustrates a block diagram of a suspension system 100 for a vehicle 110 in accordance with an example embodiment. As seen in FIG. 1, some cases, the vehicle 110 may include a frame 120. In an example embodiment, the frame 120 may be a chassis or body of the vehicle 110. In some cases, the chassis or frame 120 may support and may form the foundation structure of the vehicle 110. In an example embodiment, the chassis and frame may be formed of one or more casted subframes.

The vehicle 110 may include an axle 130. In an example embodiment, the vehicle 110 may be an electric vehicle, and the axle 130 may be an e-axle or electric beam axle. The electric vehicle may be a fully electric vehicle or a hybrid vehicle. In an example embodiment, the hybrid vehicle may be a plug-in hybrid vehicle. The axle 130 may include an electric motor 140 that may be operably coupled the axle 130. More particularly, the electric motor 140 may be integrated into the axle 130 along with an inverter to define the e-axle. The electric motor 140 may therefore propel the vehicle 110 via driving or otherwise applying propulsive torque to the axle 130. A battery of the vehicle 110 may power the electric motor 140 (e.g., via the inverter). The electric motor 140 may drive the axle 130 via a gearbox or transmission utilizing the power from the battery. The gearbox may be internal to the electric motor 140, and therefore also the axle 130. In an example embodiment, the axle 130 may be a front axle and/or a rear axle of the vehicle 110. In some cases, only the rear axle may be the axle 130, and only the rear axle may include an electric motor 140.

In some embodiments, the axle 130 may be operably coupled to a wheel assembly 150 and a brake assembly 160. Moreover, a suspension assembly 170 may be provided to operably couple to the chassis or frame 120 to the wheel assembly 150 in order to dampen bumps or other discontinuities in the surface over which the vehicle 110 travels, and prevent discomfort to occupants of the vehicle 110 responsive to those discontinuities. In some cases, the wheel assembly 150 may include a tire and a wheel rim and may operably couple with the brake assembly 160 and the axle 130. The brake assembly 160 may include a brake rotor and/or other brake assembly components to help stop or slow the vehicle 110 and specifically the wheel assembly 150. In an example embodiment, the axle 130 may have a separate wheel assembly and separate brake assembly at each distal end of the axle 130. In some cases, the brake assembly 160 may be operably coupled to the axle 130 via the wheel assembly 150. In an example embodiment, the brake assembly 160 may be directly operably coupled to the axle 130. In some cases, the wheel assembly 150 may be operably coupled to the axle 130 via the brake assembly 160.

In some embodiments, the suspension assembly 170 may include one or more dampers that extend, for example, between the frame 120 and the axle 130. For example, the vehicle 110 may include one instance of a vertical damper on a first side of the axle 130 and another instance of the vertical damper on a second side of the axle 130, which may also known as a staggered shock set up. Many other damper structures may be employed and, in cases where the axle 130 is a rear axle, especially where the vehicle 110 is a truck, sport utility vehicle, or the like, the rear axle may include a leaf spring assembly 180 as a portion of the suspension assembly 170.

As noted above, particularly when the vehicle 110 hits a discontinuity at a high speed, the inertia caused by the weight of the axle 130 for electronic vehicles (e.g., e-axle) can be quite high. If the discontinuity causes the wheel assembly 150 to lose contact with the ground, wheel speed may instantaneously increase and stresses on the leaf spring assembly 180 upon contact being restored with the ground may be large. For example, events such as acceleration over a discontinuity such as a large bump or transition between surfaces of varying friction (e.g. dry pavement, ice, dry pavement) create situations where the torque fluctuates from very high to very low to very high. This torque fluctuation creates an oscillation event which winds up the axle and may cause axle binding and even exceed acceptable levels of stress for suspension components in some cases. To address this, example embodiments may add an anti-windup bar 190 to the suspension assembly 170 in order to augment the leaf spring assembly 180. The anti-windup bar 190 may extend between a portion of the frame 120 and the axle 130 to prevent axle binding and generally inhibit windup forces that may otherwise occur in the scenario described above. The inclusion of the anti-windup bar 190 in this context may therefore ensure a smoother and more comfortable ride for occupants of the vehicle 110.

Figure 2:
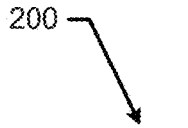
FIG. 2 illustrates a plot of wheel speed versus time for a wheel encountering a discontinuity in a driving surface in accordance with an example embodiment.
Figure 2:
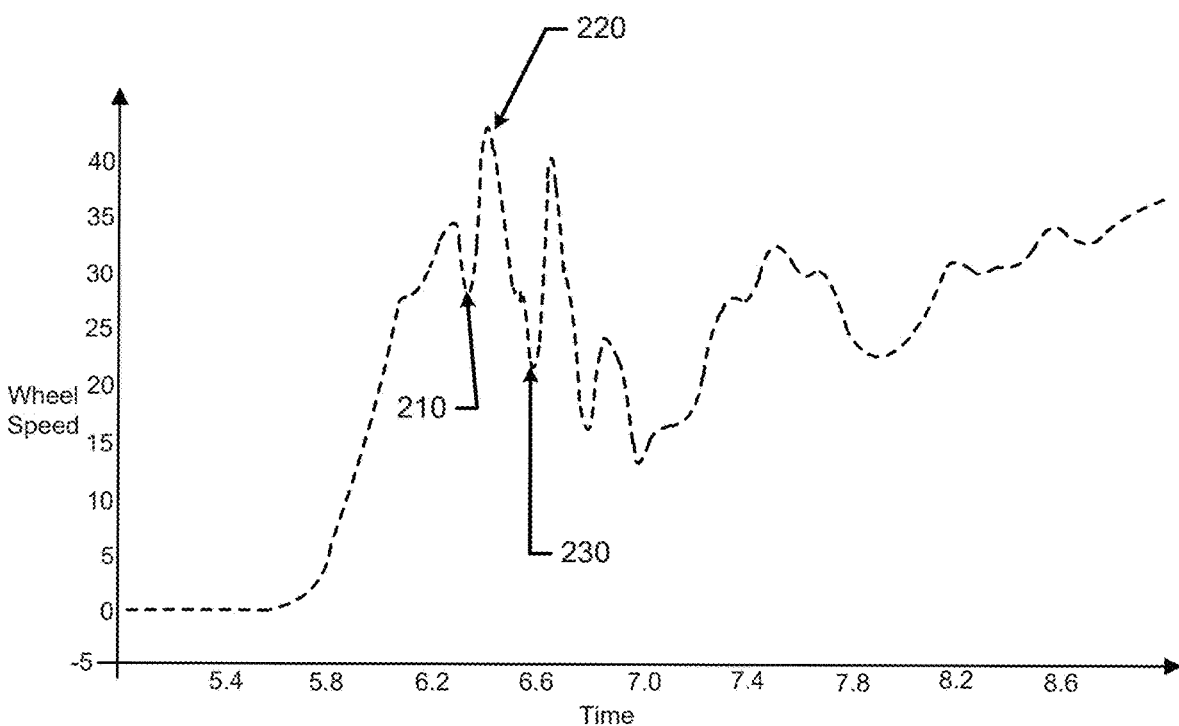

To illustrate this phenomenon, FIG. 2 shows a plot of wheel speed vs. time. In particular, FIG. 2 shows rear wheel speed for one of the rear wheels for a vehicle having a suspension system like that shown in FIG. 1, but without the anti-windup bar 190. As shown in FIG. 1, wheel speed may increase as the vehicle accelerates toward a bump, and the bump is hit at about time 6.3, shown by arrow 210. The encounter with the bump causes an instantaneous reduction in wheel speed. However, then from about time 6.4 to 6.5, the wheel may lose contact with the ground and be airborne, which causes an instantaneous increase in wheel speed shown at arrow 220. There may be a bounce that occurs, which causes maximum windup to occur at arrow 230 when wheel speed again reaches a local minimum before repeating the cycle at dampened levels as the suspension assembly 170 dampens out the suspension position variations. Notably, vibrations may also occur, which may be felt by an occupant of the vehicle, and which may be desirable to smooth out or dampen further with the anti-windup bar 190, as described herein.

Figure 3A:
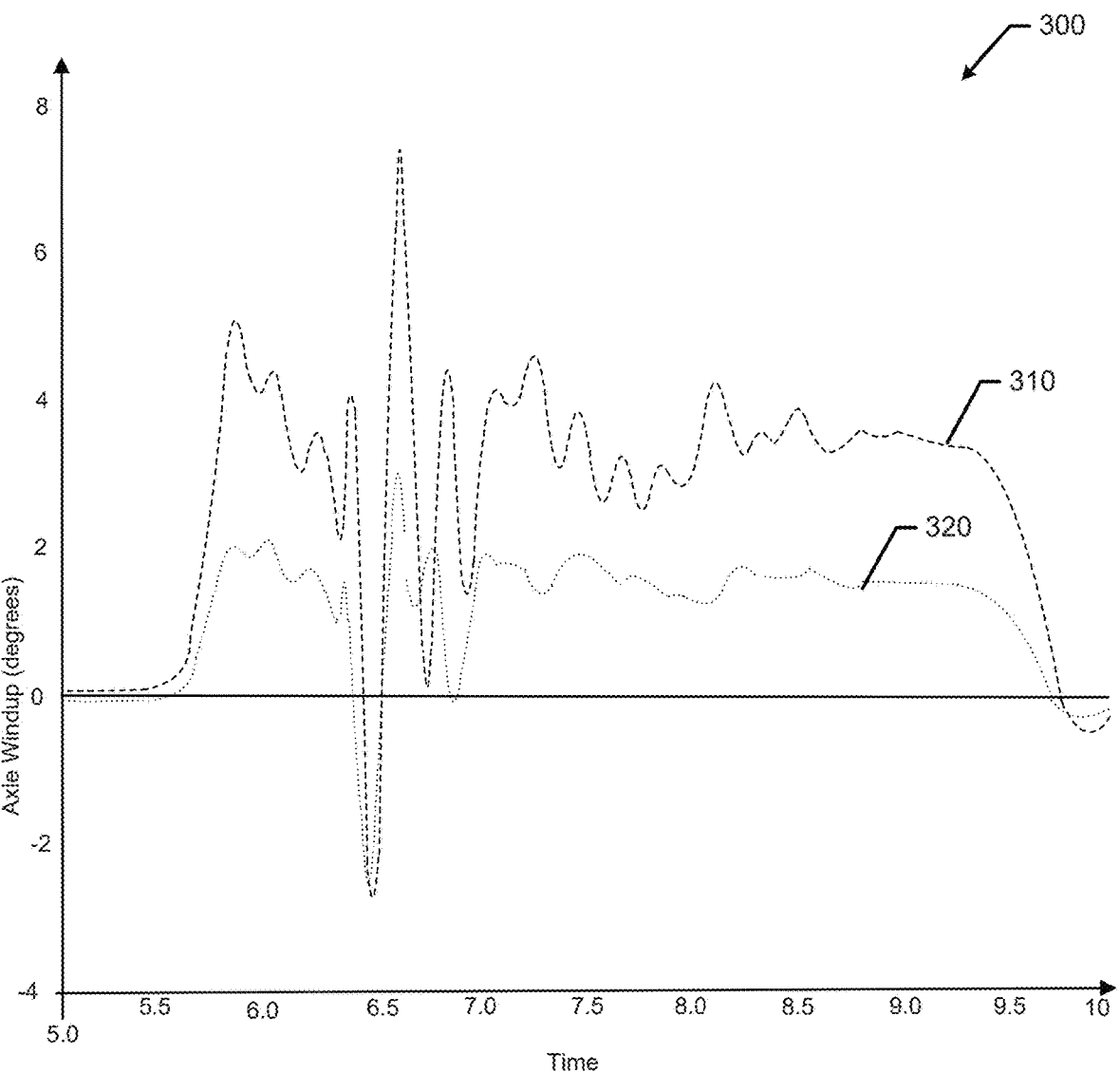
FIG. 3A illustrates a plot of axle windup angle versus time for a wheel encountering a discontinuity in a driving surface in accordance with an example embodiment.
Figure 3B:
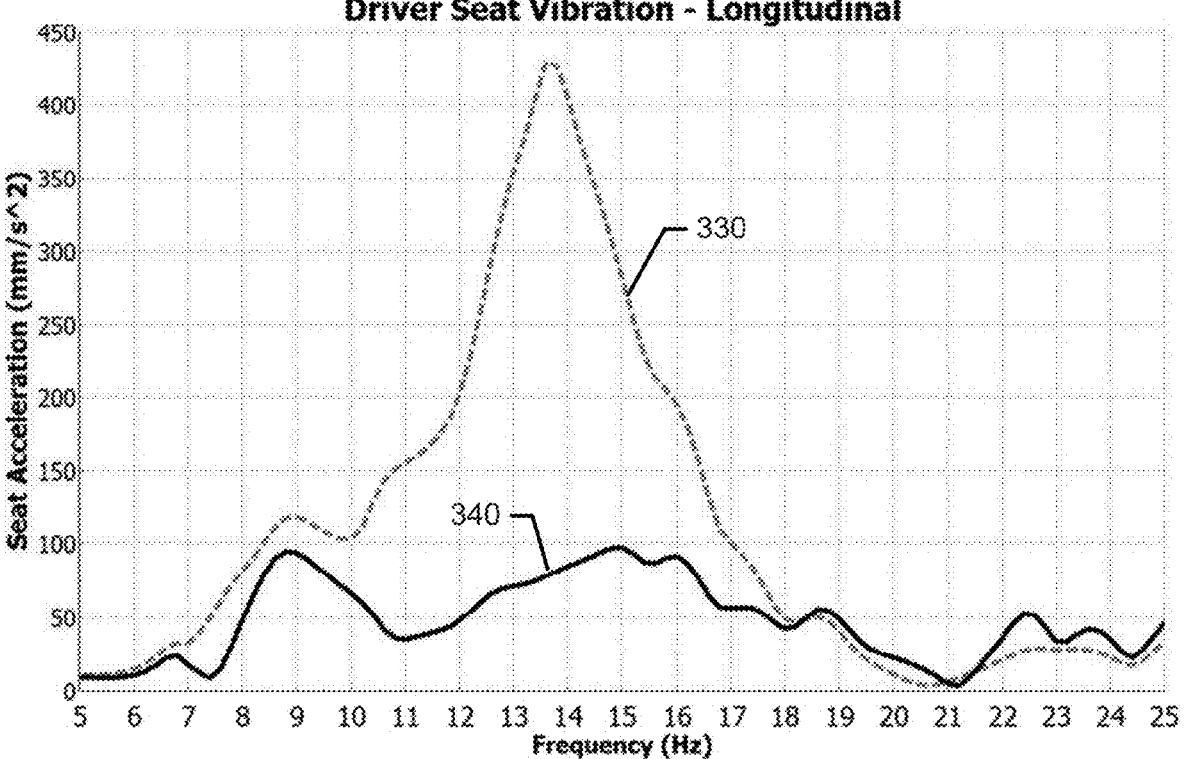
FIG. 3B illustrates a plot of driver seat vibration vs frequency in the vehicle longitudinal direction when encountering a discontinuity (or bump) in the driving surface with the rear wheels of the vehicle in accordance with an example embodiment.
Figure 3C:
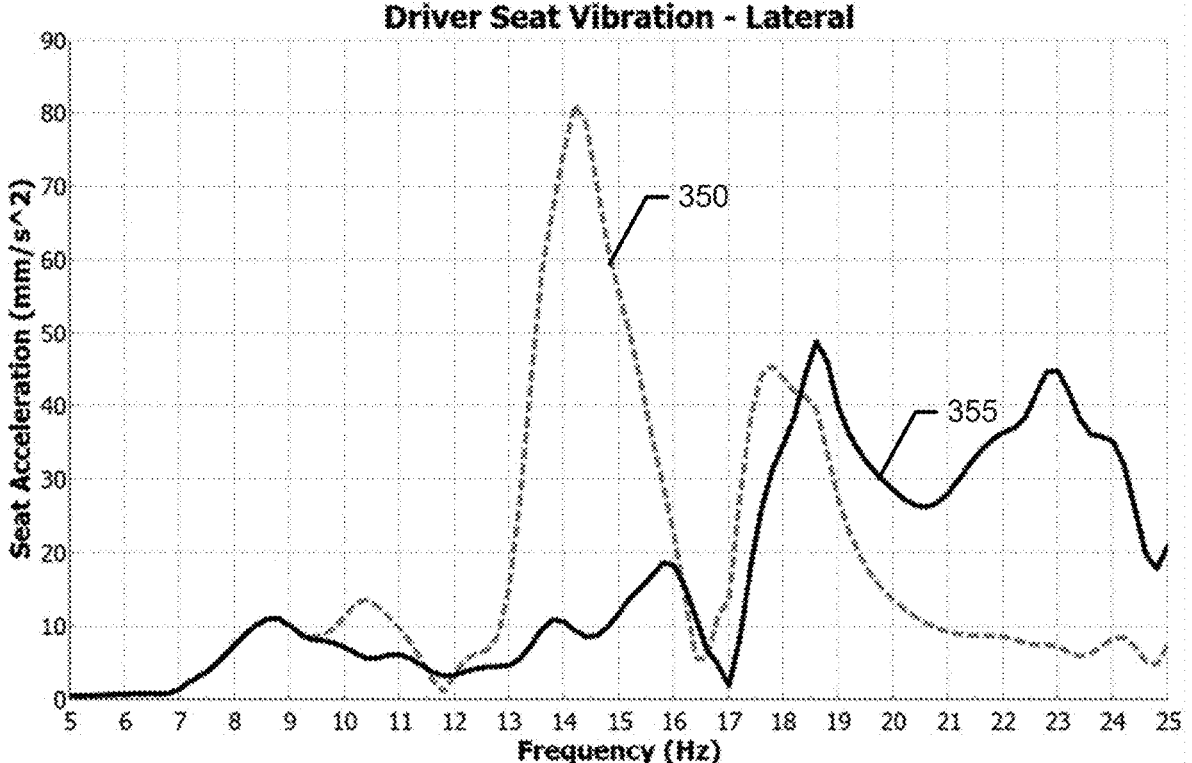
FIG. 3C illustrates a plot of driver seat vibration vs frequency in the vehicle lateral direction when encountering a discontinuity (or bump) in the driving surface with the rear wheels of the vehicle in accordance with an example embodiment.
Figure 3D:
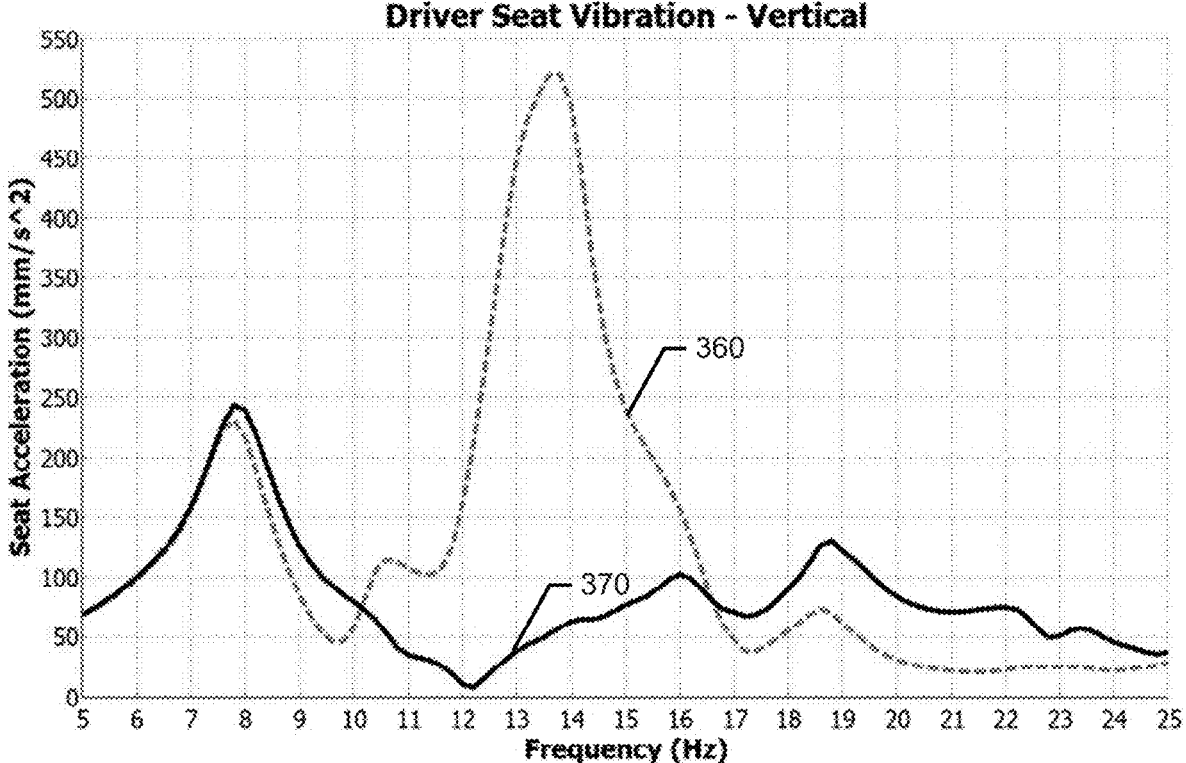
FIG. 3D illustrates a plot of driver seat vibration vs frequency in the vehicle vertical direction when encountering a discontinuity (or bump) in the driving surface with the rear wheels of the vehicle in accordance with an example embodiment.
Figure 3E:
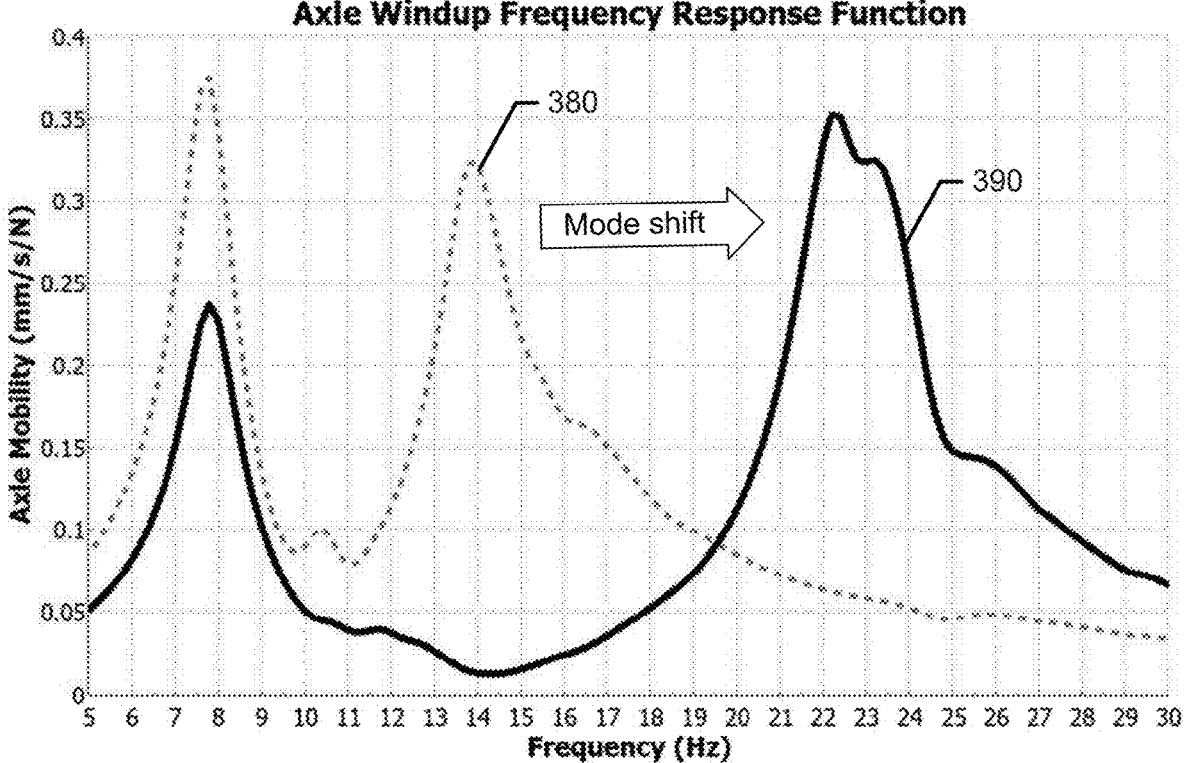
FIG. 3E illustrates a shift of the windup resonance mode of an electric beam axle with an example embodiment.

As noted above, the inertia of the axle 130 when configured as an e-axle is substantial and may create additional vibrations due to windup in some cases. Although the inertia of the full e-axle assembly is certainly an important factor in this phenomenon, the inertia of the rotor of the electric motor 140 oscillating due to the natural resonance internally in the e-axle is also a factor which example embodiments may address. FIG. 3A illustrates a plot 300 of axle windup (in degrees) versus time for an event similar to that of FIG. 2. Referring to FIG. 3A, a baseline curve 310 is shown for a suspension system that does not include the anti-windup bar 190 of FIG. 1. Meanwhile, adjusted curve 320 shows axle windup that is experienced when the anti-windup bar 190 is added into the suspension system. As can be seen from FIG. 3A, the peak amount of windup is dramatically reduced, as is the total change in windup between maximum and minimum windup values. Thus, it can be appreciated that the anti-windup bar 190 can significantly reduce windup angle, and mitigate stresses that occur at the leaf spring assembly 180, while also providing a more comfortable ride for occupants of the vehicle 110. Moreover, the addition of the anti-windup bar 190 may also reduce the vibration response of the vehicle 110 and change the modal response of the e-axle as shown in FIGS. 3B, 3C, 3D and 3E. In this regard, FIGS. 3B, 3C and 3D show seat vibration for a vehicle driving over a discontinuity in the driving surface, for example, a 20 mm protruding strip. FIG. 3B shows a plot 330 of the driver seat vibration in terms of its acceleration in the vehicle longitudinal direction versus frequency without the anti-windup bar 190 compared to a plot 340 that corresponds to a vehicle using the anti-windup bar 190. FIG. 3C illustrates a plot 350 of driver seat lateral acceleration and therefore is illustrative of driver seat lateral vibration without the anti-windup bar 190, compared to plot 355, which includes the anti-windup bar 190. FIG. 3D similarly shows a plot 360 of the driver seat vibration in terms of its acceleration in the vehicle vertical direction versus frequency without the anti-windup bar 190 compared to a plot 370 that corresponds to a vehicle using the anti-windup bar 190. FIG. 3E illustrates a plot 380 of the frequency response function of an electric beam axle without the anti-windup bar 190, and a plot 390 with the anti-windup bar 190 to clearly show the movement of the windup resonant mode of the electric beam axle with the addition of the anti-windup bar 190. As can be seen in FIGS. 3B, 3C and 3D, the anti-windup bar 190 increases windup resonance mode of the electric beam axle from 13 Hz to 22 Hz and reduces driver seat vibration response.

Figure 4:
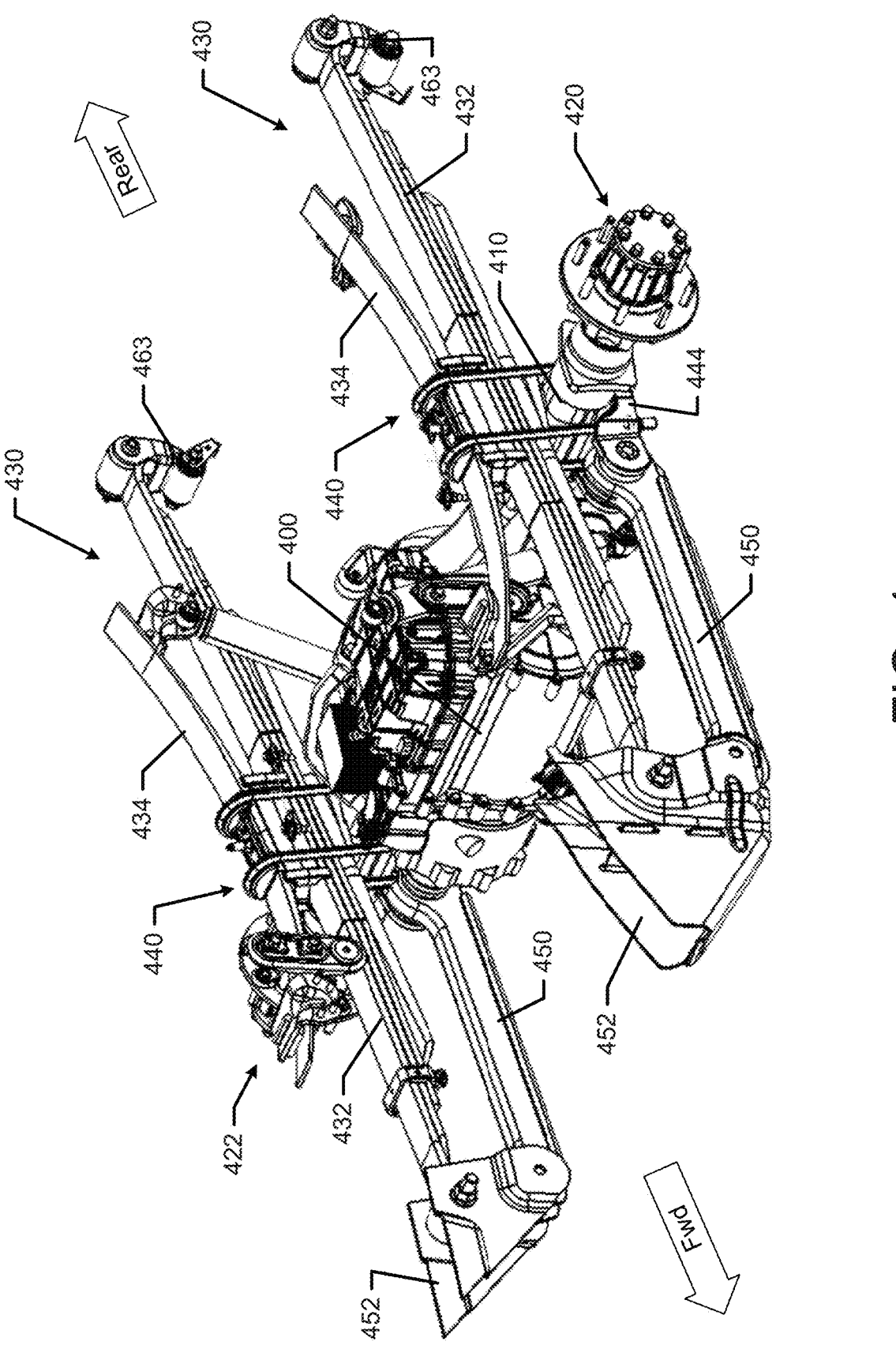
FIG. 4 illustrates a perspective view of a rear wheel suspension system in accordance with an example embodiment.
Figure 5:
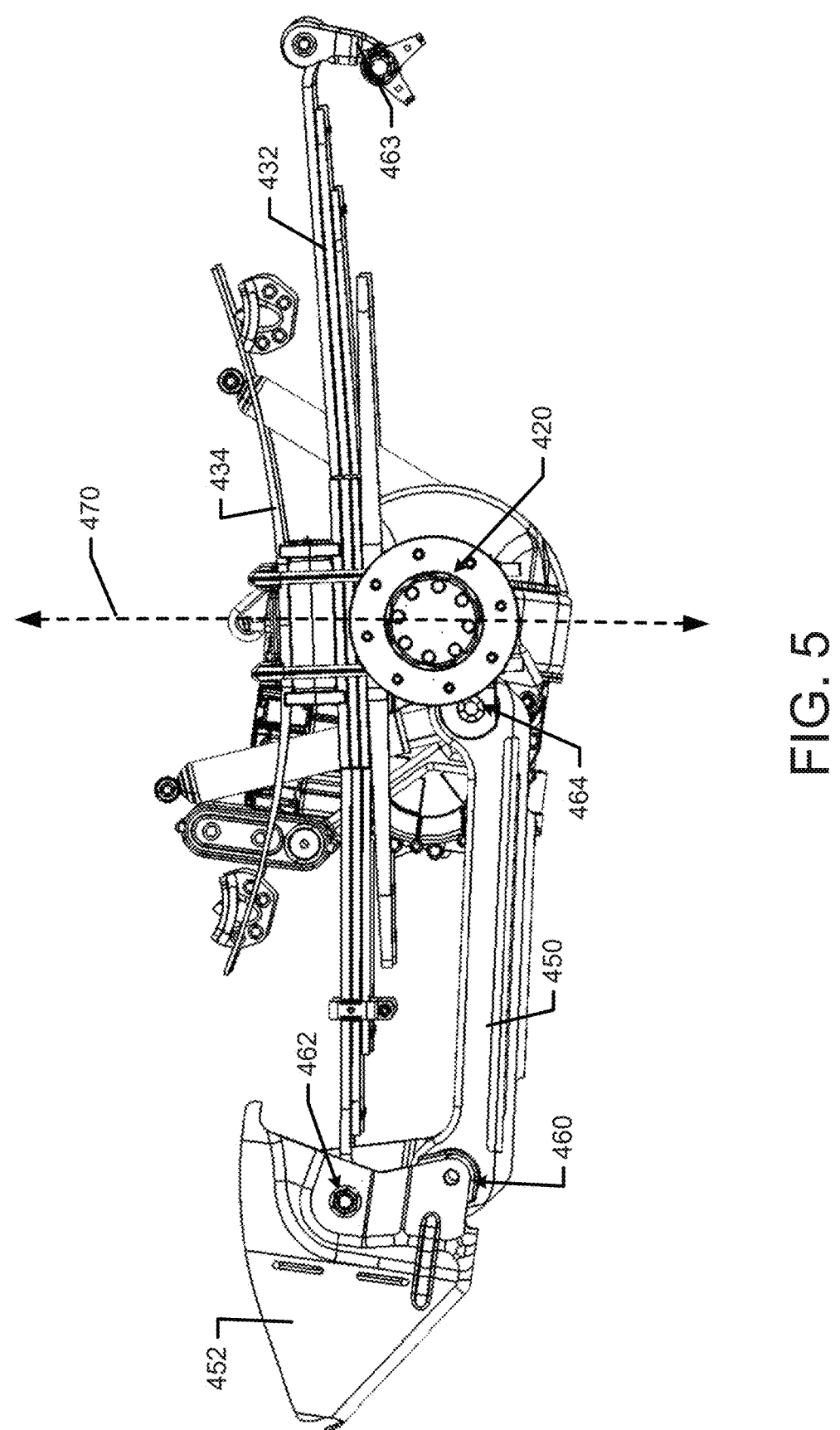
FIG. 5 illustrates a side view of the rear wheel suspension system of FIG. 4 in accordance with an example embodiment.
Figure 6:
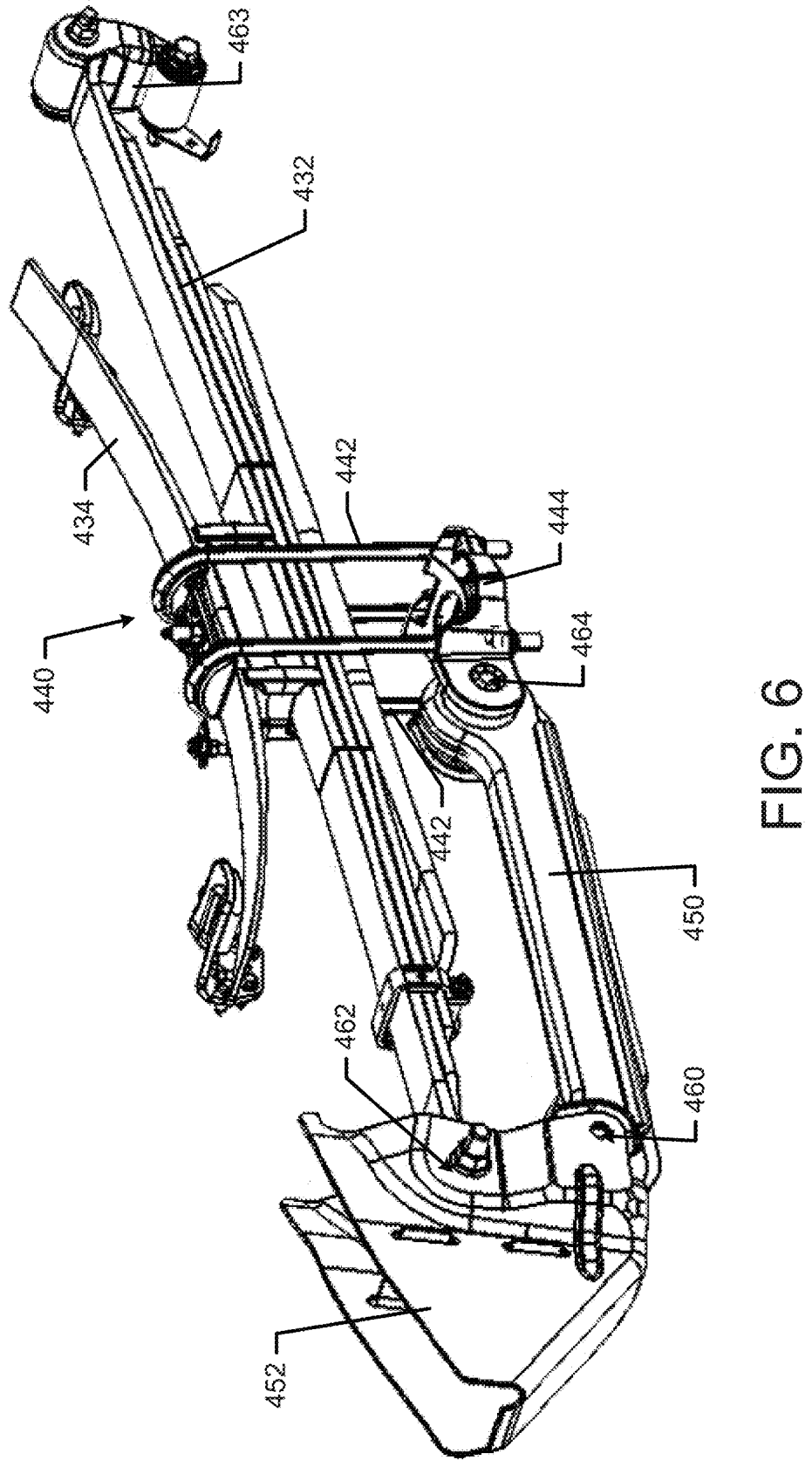
FIG. 6 illustrates a perspective view of the leaf spring assembly and anti-windup bar in isolation in accordance with an example embodiment.

The anti-windup bar 190 can be implemented, installed and/or structured in various ways. FIGS. 4-6 illustrate various perspectives of a suspension system showing one example structure and arrangement. In this regard, FIG. 4 shows an e-motor 400 may be directly coupled to or otherwise integrated into an electric beam axle (e-axle 410). For example, the e-axle 410 may be operably coupled to the e-motor 400 via an axle housing that is directly part of the e-axle 410. The axle housing may also be part of the electric motor housing. In some cases, the e-axle 410 may be two separate axles connected via a differential. In such examples, the two separate axles may connect via the differential within the axle housing. The e-motor 400 may be offset from a lateral axis of the e-axle 410.

The e-axle 410 may extend between a first wheel hub 420 and a second wheel hub 422, which are on left and right sides of the rear end of the vehicle, respectively. Thus, for each respective one of the first and second wheel hubs 420 and 422, a corresponding instance of a suspension assembly 430 is provided to include a primary leaf spring 432 and an auxiliary leaf spring 434. In this example, the auxiliary leaf spring 434 includes a single leaf, and is shorter than the primary leaf spring 432. The primary leaf spring 432 includes a plurality of leaves that combine to form a leaf spring pack that is bound together by a number of clips and, at a center portion thereof, by a U-bolt assembly 440. The U-bolt assembly 440 includes multiple (in this case two) U-shaped bolts 442 that extend around both the auxiliary leaf spring 434 and the primary leaf spring 432 to be affixed at a coupling plate 444.

Notably, the auxiliary leaf spring 434 may be omitted in some cases. However, when the auxiliary leaf spring 434 is included, the auxiliary leaf spring 434 may be vertically separated from the primary leaf spring 432 by a spacer, but otherwise be provided on the same side of the e-axle 410 as the primary leaf spring 432. In this example, the auxiliary leaf spring 434 and the primary leaf spring 432 are both on the top side (relative to the ground or surface over which the vehicle travels) of the e-axle 410. Thus, for example, the coupling plate 444 is disposed below the e-axle 410 and is used to retain the e-axle 410, the auxiliary leaf spring 434 and the primary leaf spring 432 in position relative to one another. Moreover, the U-bolt assembly 440 may attach to each of the longitudinal midpoints of the auxiliary leaf spring 434 and the primary leaf spring 432 such that the auxiliary leaf spring 434 and the primary leaf spring 432 may (particularly in an unloaded condition) be symmetrical about the U-bolt assembly 440.

The auxiliary leaf spring 434 may be shorter in length than the primary leaf spring 432 and may generally have a higher degree of bend than the primary leaf spring 432. Thus, since both the auxiliary leaf spring 434 and the primary leaf spring 432 may be operably coupled to the frame of the vehicle at or near their respective opposing ends (e.g., via brackets and or bushings), it can be appreciated that the ends of the auxiliary leaf spring 434 and the primary leaf spring 432 may each attach to the frame at corresponding different portions of the frame.

As noted above, an anti-windup bar 450 may be added to provide a smoother ride for passengers. The anti-windup bar 450 of this example, may be provided as a substantially straight bar or elongated member that extends between the e-axle 410 and the frame. In an example embodiment, the anti-windup bar 450 may be operably coupled to the frame at a first portion of the frame via a mounting bracket 452 disposed at the first portion of the frame. The mounting bracket 452 may be welded or bolted to the frame at the first portion and may also provide operable coupling of the frame to the primary leaf spring 432. In this regard, for example, the anti-windup bar 450 may be operably coupled to the mounting bracket 452 via a first bushing 460, and the primary leaf spring 432 may be operably coupled to the mounting bracket 452 via a second bushing 462. The primary leaf spring 432 may be operably coupled to the frame at a second end via a shackle 463 in some cases.

The anti-windup bar 450 may be operably coupled to the mounting bracket 452 (and thereby also the frame) via the first bushing 460 at or near a first end of the anti-windup bar 450. The anti-windup bar 450 may also be operably coupled to the coupling plate 444 of the U-bolt assembly 440 at or near a second end of the anti-windup bar 450 via a third bushing 464. The attachment of the anti-windup bar 450 to the coupling plate 444, effectively means that the anti-windup bar 450 is mounted below the e-axle 410 in this example arrangement. However, more generally, the anti-windup bar 450 is mounted to an opposite side of the e-axle 410 as both the auxiliary leaf spring 434 and the primary leaf spring 432. This location of connection, coupled with the straight and elongated nature of the anti-windup bar 450, provides a long moment arm or lever arm via which to resist axle windup angle when discontinuities in driving surfaces are encountered, which provides a smoother ride for the reasons outlined above.

The mounting bracket 452 may be elongated in a vertical direction and/or horizontal direction as it extends along and away from the frame to provide a desired spacing apart of the locations of the first and second bushings 460 and 462. Selection of the distance that separates the first and second bushings 460 and 462 may, at least in part, determine an orientation of the anti-windup bar 450 relative to the primary leaf spring 432 (or at least the portion of the primary leaf spring 432 that extends between the second bushing 462 and the U-bolt assembly 440), as well as relative to the e-axle 410. The orientation may be selected to be substantially orthogonal to a vertical centerline 470 passing through the first and second wheel hubs 420 and 422, or various other angles within about 10-20 degrees of being orthogonal.

In some example embodiments, the anti-windup bar 450 may extend substantially parallel to the ground and/or substantially parallel to the primary leaf spring 432. Moreover, the orientation of the anti-windup bar 450 relative to the e-axle 410 may be such that a longitudinal centerline of the anti-windup bar 450 is tangential to an outer perimeter of the e-axle 410 to strategically locate the lever arm of the anti-windup bar 450 relative to windup angle and windup torque that is resisted thereby. When not parallel to each other, the anti-windup bar 450 and the primary leaf spring 432 may alternatively become closer together as distance from the e-axle 410 increases (i.e., as distance to the mounting bracket 452 and the frame decreases). This orientation may, for example, enhance leverage of the anti-windup bar 450 in relation to counteracting the effects of increased inertia and the potential occurrence of windup when discontinuities are encountered in a road surface.

The locations of the first and second bushings 460 and 462 may also be selected to position the first bushing 460 closer to the vertical centerline 470 than the second bushing 462, which may result in the anti-windup bar 450 being shorter than a distance from the second bushing 462 to the vertical centerline 470 (i.e., shorter than half a length of the primary leaf spring 432). However, the length of the anti-windup bar 450, and its anchoring position relative to the primary leaf spring 432 and the e-axle 410 may be altered in various embodiments in order to manage the mass of the e-axle 410 and thereby also control windup torque and angles by providing a lever arm of a desired length and location.

A suspension system of a vehicle may be therefore provided. The suspension system may include an electric beam axle operably coupled to a frame of the vehicle, an electric motor operably coupled to the electric beam axle to propel the vehicle, a wheel assembly including a wheel operably coupled to the electric beam axle, a leaf spring assembly and an anti-windup bar. The leaf spring assembly may be operably coupled to a first portion of the frame at a first end of the leaf spring assembly, operably coupled to a second portion of the frame at a second end of the leaf spring assembly (e.g., directly or indirectly (e.g., via a shackle)), and operably coupled to the electric beam axle between the first and second ends of the leaf spring assembly. The anti-windup bar may be operably coupled to the first portion of the frame at a first end of the anti-windup bar, and operably coupled to the electric beam axle at a second end of the anti-windup bar.

The suspension system of a vehicle of some embodiments may include additional features, modifications, augmentations and/or the like to achieve further objectives or enhance performance of the suspension system. The additional features, modifications, augmentations and/or the like may be added in any combination with each other. Below is a list of various additional features, modifications, and augmentations that can each be added individually or in any combination with each other. For example, the anti-windup bar and the leaf spring assembly connect to opposite sides of the electric beam axle. In an example embodiment, the leaf spring assembly may be connected above the electric beam axle and the anti-windup bar may be connected below the electric beam axle. In some cases, a direction of extension of the anti-windup bar is substantially parallel to a direction of extension of the leaf spring assembly from the first end of the leaf spring assembly to a point at which the leaf spring assembly operably couples to the electric beam axle. In an example embodiment, the leaf spring assembly may include a primary leaf spring attached to the first and second portions of the frame, and an auxiliary leaf spring operably coupled to the frame at portions thereof located between the first and second portions of the frame. In some cases, the auxiliary leaf spring may be disposed on an opposite side of the primary leaf spring as the anti-windup bar. In an example embodiment, a single U bolt assembly may operably couple the auxiliary leaf spring, the primary leaf spring and the anti-windup bar to the electric beam axle. In some cases, the second end of the anti-windup bar may operably couple to the electric beam axle via a coupling plate disposed below the electric beam axle. In an example embodiment, the anti-windup bar may extend in a substantially straight line from the coupling plate to a mounting bracket disposed at the first portion of the frame to which the anti-windup bar connects at a first bushing, and the leaf spring assembly may also connect to the first portion of the frame via the mounting bracket at a second bushing. In some cases, a distance between the first bushing and a vertical centerline passing through the electric beam axle is less than a distance between the second bushing and the vertical centerline.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to difficulties are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A suspension system of a vehicle, the suspension system comprising:

an electric beam axle operably coupled to a frame of the vehicle;

an electric motor operably coupled to the electric beam axle to propel the vehicle;

a wheel assembly including a wheel operably coupled to the electric beam axle;

a leaf spring assembly operably coupled to a first portion of the frame at a first end of the leaf spring assembly, operably coupled to a second portion of the frame at a second end of the leaf spring assembly, and operably coupled to the electric beam axle between the first and second ends of the leaf spring assembly; and an anti-windup bar operably coupled to the first portion of the frame at a first end of the anti-windup bar, and operably coupled to the electric beam axle at a second end of the anti-windup bar, wherein the second end of the anti-windup bar operably couples to the electric beam axle via a coupling plate disposed below the electric beam axle.

2. The suspension system of claim 1, wherein the anti-windup bar and the leaf spring assembly connect to opposite sides of the electric beam axle.

3. The suspension system of claim 2, wherein the leaf spring assembly is connected above the electric beam axle and the anti-windup bar is connected below the electric beam axle.

4. The suspension system of claim 2, wherein a direction of extension of the anti-windup bar is substantially parallel to a direction of extension of the leaf spring assembly from the first end of the leaf spring assembly to a point at which the leaf spring assembly operably couples to the electric beam axle.

5. The suspension system of claim 1, wherein the leaf spring assembly comprises a primary leaf spring attached to the first and second portions of the frame, and an auxiliary leaf spring operably coupled to the frame at portions thereof located between the first and second portions of the frame.

6. The suspension system of claim 5, wherein the auxiliary leaf spring is disposed on an opposite side of the primary leaf spring as the anti-windup bar.

7. The suspension system of claim 6, wherein a single U bolt assembly operably couples the auxiliary leaf spring, the primary leaf spring and the anti-windup bar to the electric beam axle.

8. The suspension system of claim 1, wherein the anti-windup bar extends in a substantially straight line from the coupling plate to a mounting bracket disposed at the first portion of the frame to which the anti-windup bar connects at a first bushing, and wherein the leaf spring assembly also connects to the first portion of the frame via the mounting bracket at a second bushing.

9. The suspension system of claim 8, wherein a distance between the first bushing and a vertical centerline passing through the electric beam axle is less than a distance between the second bushing and the vertical centerline.

10. A suspension system of a vehicle, the suspension system comprising:

an electric beam axle operably coupled to a frame of the vehicle;

an electric motor operably coupled to the electric beam axle to propel the vehicle;

a wheel assembly including a wheel operably coupled to the electric beam axle;

a leaf spring assembly operably coupling the frame and the electric beam axle, the leaf spring assembly comprising a primary leaf spring and an auxiliary leaf spring; and an anti-windup bar operably coupled to frame and the electric beam axle, wherein the leaf spring assembly is operably coupled to a first portion of the frame at a first end of the leaf spring assembly, operably coupled to a second portion of the frame at a second end of the leaf spring assembly, and operably coupled to the electric beam axle between the first and second ends of the leaf spring assembly, wherein the auxiliary leaf spring is disposed on an opposite side of the primary leaf spring as the anti-windup bar, and wherein a single U bolt assembly operably couples the auxiliary leaf spring, the primary leaf spring and the anti-windup bar to the electric beam axle.

11. The suspension system of claim 10, wherein the anti-windup bar and the leaf spring assembly connect to opposite sides of the electric beam axle.

12. The suspension system of claim 11, wherein the leaf spring assembly is connected above the electric beam axle and the anti-windup bar is connected below the electric beam axle.

13. The suspension system of claim 11, wherein a direction of extension of the anti-windup bar is substantially parallel to a direction of extension of the leaf spring assembly from a first end of the leaf spring assembly to a point at which the leaf spring assembly operably couples to the electric beam axle.

14. The suspension system of claim 10, wherein the second end of the anti-windup bar operably couples to the electric beam axle via a coupling plate disposed below the electric beam axle.

15. The suspension system of claim 14, wherein the anti-windup bar extends in a substantially straight line from the coupling plate to a mounting bracket disposed at the first portion of the frame to which the anti-windup bar connects at a first bushing, and wherein the leaf spring assembly also connects to the first portion of the frame via the mounting bracket at a second bushing.

16. The suspension system of claim 15, wherein a distance between the first bushing and a vertical centerline passing through the electric beam axle is less than a distance between the second bushing and the vertical centerline.

17. A suspension system of a vehicle, the suspension system comprising:

an electric beam axle operably coupled to a frame of the vehicle;

an electric motor operably coupled to the electric beam axle to propel the vehicle;

a wheel assembly including a wheel operably coupled to the electric beam axle;

a leaf spring assembly operably coupled to a first portion of the frame at a first end of the leaf spring assembly, operably coupled to a second portion of the frame at a second end of the leaf spring assembly, and operably coupled to the electric beam axle between the first and second ends of the leaf spring assembly; and an anti-windup bar operably coupled to the first portion of the frame at a first end of the anti-windup bar, and operably coupled to the electric beam axle at a second end of the anti-windup bar, wherein the leaf spring assembly is connected above the electric beam axle proximate the frame and the anti-windup bar is connected below the electric beam axle away from the frame, and wherein the leaf spring assembly and the anti-windup bar are vertically aligned.

* * * * *